United States Patent [19]

Sexton

[11] Patent Number: 5,001,747
[45] Date of Patent: Mar. 19, 1991

[54] FREQUENCY OFFSET ESTIMATOR FOR DATA MODEM

[75] Inventor: Thomas A. Sexton, Schaumburg, Ill.

[73] Assignee: Racal Data Communication Inc., Sunrise, Fla.

[21] Appl. No.: 468,029

[22] Filed: Jan. 22, 1990

[51] Int. Cl.$^5$ ............................................... H04B 3/24
[52] U.S. Cl. ...................................... 379/410; 379/3; 379/406
[58] Field of Search ..................... 379/3, 6, 406, 408, 379/410, 411

[56] References Cited

U.S. PATENT DOCUMENTS

| | | | |
|---|---|---|---|
| 3,903,377 | 9/1975 | Sato | 379/411 |
| 4,072,830 | 2/1978 | Gitlin et al. | 379/411 |
| 4,232,400 | 11/1980 | Yamamoto et al. | 455/305 |
| 4,558,187 | 12/1985 | Billi et al. | 379/402 |
| 4,813,073 | 3/1989 | Ling | 379/410 |
| 4,926,472 | 5/1990 | Batruni et al. | 379/411 |

OTHER PUBLICATIONS

"The Retrieval of Harmonics From a Covariance Function", Geophysical Journal of the Royal Astronomical Society, 1973, by Pisarenko.
"Adaptive Noise Cancelling: Principles and Applications", Proceedings of the IEEE, vol. 63, Mar. 1975, by Widrow et al., pp. 1692–1719.
"A Passband Data-Driven Echo Cancellar for Full-Duplex Transmission on Two-Wire Circuits", IEEE Transactions on Communication, vol. COM-25, No. 7, Jul. 1977, by S. B. Weinstein, pp. 654–666.

Primary Examiner—James L. Dwyer
Assistant Examiner—M. Shehata
Attorney, Agent, or Firm—Jerry A. Miller

[57] ABSTRACT

A method for estimating an amount of phase roll on a transmission channel. A signal of known frequency is transmitted over the channel by a near end modem. An average noise autocorrelation matrix is subtracted from an average signal plus noise autocorrelation matrix, both as received by a near end modem. The eigenvector of the resulting matrix is computed. The complex root of a quadratic with coefficients equal to the eigenvector elements is computed to solve for a difference between the frequency of the transmitted signal and the echosed receive signal to determine the phase roll.

12 Claims, 4 Drawing Sheets

5,001,747

FREQUENCY OFFSET ESTIMATOR FOR DATA MODEM

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates generally to the field of data communications. More particularly, this invention relates to a method and apparatus for estimating phase roll in a data communication device such as an echo canceller or data modem.

2. Background of the Invention

When full duplex two wire telephone lines are used for data communication, echoes are often produced by impedance mismatches at the circuitry use to convert two wire transmission lines into four wire transmission lines. This circuitry generally takes the form of a hybrid transformer. If left uncancelled, such echoes can increase transmission errors to unacceptable levels.

Echo cancelers which are specialized to deal separately with near end echoes and far end echoes are described in U.S. Pat. No. 4,813,073. Representative echo cancelers are described in U.S. Pat. No. 4,232,400 to Yamamoto et al. and U.S. Pat. No. 3,903,377 to Sato.

One task of an echo canceller is to estimate characteristics of the network responsible for the echoes. One such characteristic which is often estimated is the phase roll produced by the network. Phase roll can be expressed as a frequency difference between signals transmitted and the frequency of the echo of the same signal when it returns to the transmitter. Estimation of this parameter is traditionally done by use of phase locking techniques such as those described by U.S. Pat. No. 4,072,830 to Gitlin et al., U.S. Pat. No. 4,813,073 to Ling and "A Passband Data-Driven Echo Canceller for Full Duplex Transmission on Two-Wire Circuits", S. B. Weinstein, IEEE Transactions on Communication, Vol. COM-25, No. 7, July 1977. While this and similar techniques have been effectively used to characterize phase roll, they are comparatively slow to converge to an accurate estimate of the phase roll.

In U.S. Pat. No. 4,588,187 to Billi et al., phase roll is calculated for use in cancelling voice echoes. This patent uses a pilot tone to train an echo canceller.

Normally, an echo canceller estimates the phase roll, initial value of phase and the tap values required for the particular channel. The present invention provides a substantially more rapid convergence to a phase roll estimate by decoupling estimation of the phase roll frequency (or phase roll herein after) component from these other components normally estimated by an echo canceller. Once this is done, the other parameters may be estimated, for example, as described by Widrow et al. in "Adaptive Noise Cancelling: Principles and Applications", Proceedings of the IEEE, Vol. 63, Dec. 1975.

SUMMARY OF THE INVENTION

It is an object of the present invention to provide an improved method for computing an estimate of phase roll.

It is an advantage that the present invention provides a more rapid estimate than popular prior art techniques.

It is another advantage that the present invention is not restricted to analysis of signals corrupted by white noise only.

These and other objects, advantages and features of the invention will become apparent to those skilled in the art upon consideration of the following description of the invention.

In one embodiment of the present invention a method for estimating a phase roll on a communication channel, includes the steps of: measuring an average noise correlation on the communication channel; transmitting a known signal having a predetermined frequency over the channel; measuring an average signal plus noise correlation echoed as a result of the transmitting of the known signal; forming a noise autocorrelation matrix B and a signal plus noise autocorrelation matrix D; subtracting B from D to form a difference matrix F; calculating an eigenvector C associated with a zero eigenvalue of F; solving for a root of the eigenvector C; and computing a phase roll by finding a difference between the angle of the root and the predetermined frequency. Preferably, the process further includes canceling a near end echo prior to the other steps.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
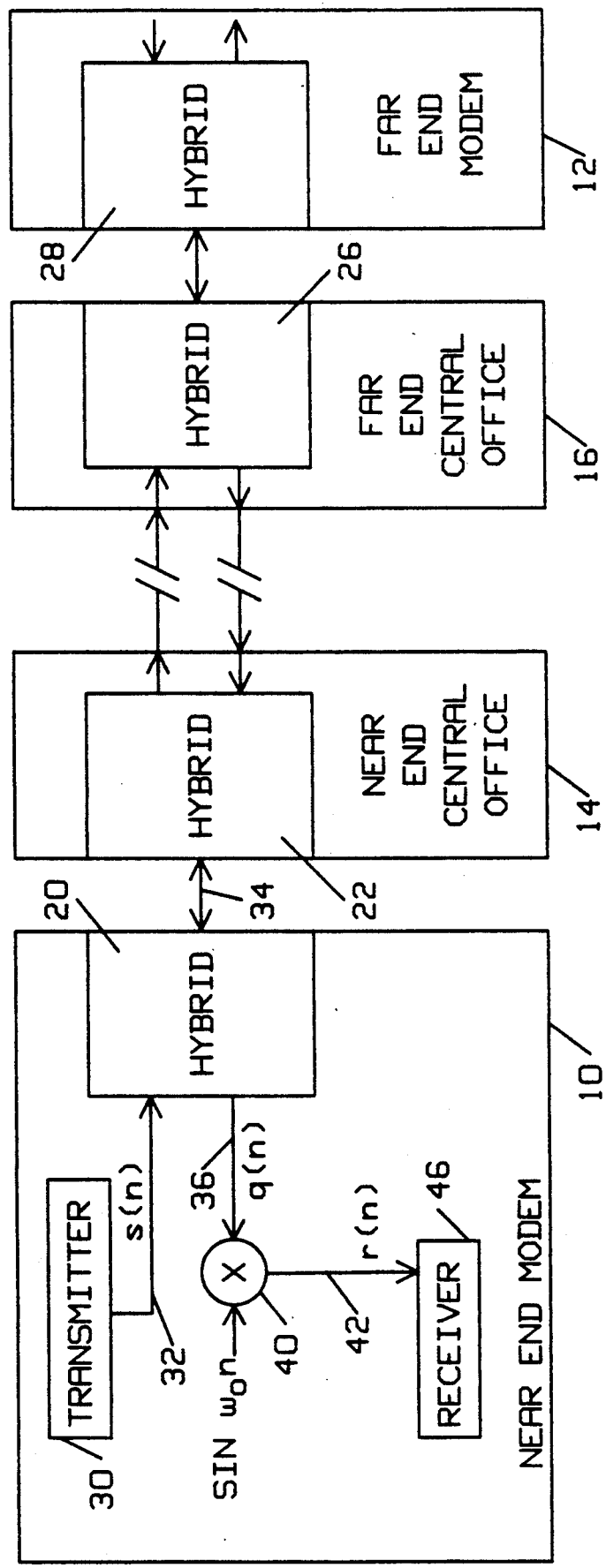
FIG. 1 is a block diagram of an example modem system.

Turning now to FIG. 1, a block diagram of an example modem system is shown. In this figure, a near end modem 10 is coupled to a far end modem 12 through a telephone network represented in this figure by a near end central office 14 and a far end central office 16. Echoes may be produced at any of several locations in this system. Near end echoes may be produced by mismatches at hybrid 20 of the near end modem 10 or hybrid 22 of the near end central office 14. Far end echoes may be produced at other places in the network such as at hybrid 26 of far end central office 16 or hybrid 28 of far end modem 12. Phase roll may be produced at isolated or distributed locations throughout the network.

The present method can be used with either a real number computation or a complex number computation. As will be seen later, the basic differences is the process are that the real case uses a three by three matrix and the complex case uses a two by two matrix, complex signals are transmitted and used by the modulator, and other associated differences required for analogous computations. These differences will be pointed out as the discussion progresses. In the preferred implementation, the real number technique is used.

The near end modem 10 is shown to have a transmitter 30 which produces a transmitted signal s(n) on line 32. Signals received from two wire transmission line 34 and passed through hybrid 20 are designated q(n) at line 36. (For the complex case, a phase splitter should be inserted into line 36. Those skilled in the art will appreciate that this changes the noise characteristics somewhat.) This signal is passed to a free running demodulator 40 which can be thought of as a multiplier which multiplies q(n) by sin $w_o n$ (by $e^{-jw_o n}$ in the complex case) to produce a signal at line 42 designated r(n) which is passed to the remaining circuitry of the modem receiver 46.

Figure 2:
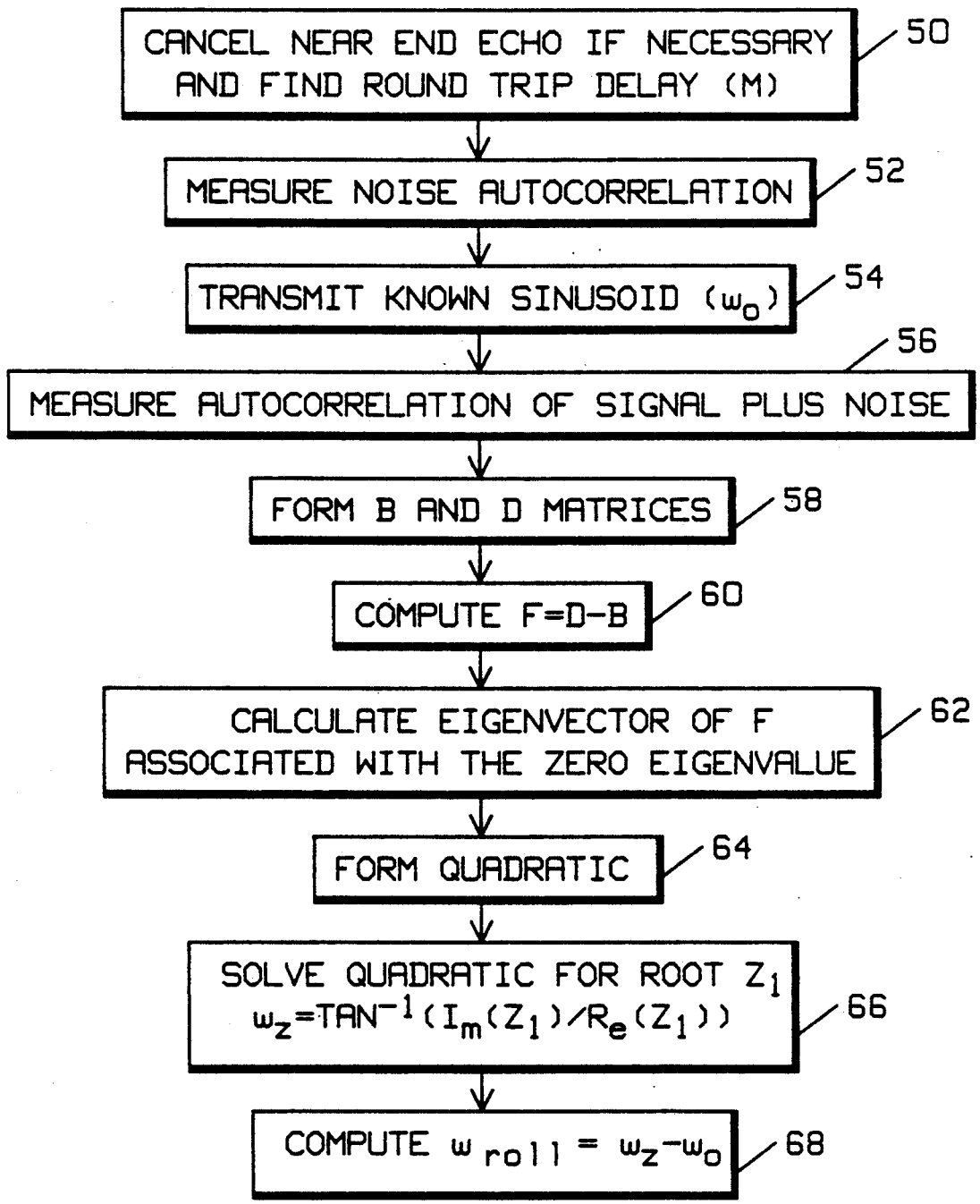
FIG. 2 is a flow chart of the process of estimating the phase roll according to the present invention.

The estimation process of the present invention is described in detail in connection with FIG. 2. This process is an extension of a process used in connection with astronomical calculations described by Pisarenko in "The Retrieval of Harmonics From a Covariance Function", Geophysical Journal of the Royal Astronomical Society, 1973 which has been adapted to aid in rapid convergence of a phase roll estimate. This paper is incorporated by reference herein. At step 50, any near end echo which is present is estimated and operation of a near end echo canceller is initiated if necessary. An end to end telephone link is then established and a measurement of the round trip delay (M) is made. This does not require knowledge of the phase roll. Control then passes to step 52 in which a measurement of the noise autocorrelation is made. This is accomplished by setting $\{s_n\}$ to zero for all values of n. That is, no signal is transmitted from the near end modem. $\{q_n\}$ is then demodulated to obtain the sequence $\{r_n\}$. The correlation b(n) is then computed using time averages as follows:

$$b(n) = E(r_k r_{k-n})$$

for the real case or:

$$b(n) = E(r_k r^*_{k-n})$$

for the complex case,
where n = −1, 0, 1 if complex values are used or where n = −2, −1, 0, 1, 2 if real values are used. Any samples for which K < M are discarded.

The recognition that echo cancellation belongs to a class of problems known as channel estimation has lead to the above measurement of b(n). This measurement improves the original method described by Pisarenko by providing an analytic solution tolerant of correlated or non-white noise.

Next, a known sinusoid is transmitted at 54 so that: $\{s_n\} = \cos w_o n$ (or for the complex case $\{s_n\} 32\ e^{jw_o n}$) for n greater than or equal to zero. The same type of measurement is then taken to obtain a signal plus noise d(n) autocorrelation measurement at 56. That is:

$$d(n) = E(r_k r_{k-n})$$

for the real case or $$d(n) = E(r_k r^*_{k-n})$$

for the complex case,
where n = −1, 0, 1 if complex values are used or where n = −2, −1, 0, 1, 2 if real values are used. Any samples for which K < M are discarded.

Next, B and D matrices are formed as follows at step 58:

$$B = \begin{bmatrix} b(0) & b(1) & b(2) \\ b(-1) & b(0) & b(1) \\ b(-2) & b(-1) & b(0) \end{bmatrix}$$

and $$D = \begin{bmatrix} d(0) & d(1) & d(2) \\ d(-1) & d(0) & d(1) \\ d(-2) & d(-1) & d(0) \end{bmatrix}$$

for the real case, or:

$$B = \begin{bmatrix} b(0) & b(1) \\ b(-1) & b(0) \end{bmatrix}$$

and $$D = \begin{bmatrix} d(0) & d(1) \\ d(-1) & d(0) \end{bmatrix}$$

for the case of complex numbers.

At step 60, a matrix F is computed as the difference between B and D as:

$$F = D - B.$$

Next, the eigenvector C associated with the zero eigenvalue of the F matrix is computed at step 62 where C is the column vector:

$$C = \begin{bmatrix} c(0) \\ c(1) \\ c(2) \end{bmatrix}$$

for the real case or:

$$C = \begin{bmatrix} c(0) \\ c(1) \end{bmatrix}$$

for the complex case.

At step 64, a quadratic equation is formed in the real case as follows:

$$0 = c(0) + c(1)z + c(2)z^2$$

or for the complex case, the following linear equation is formed:

$$0 = c(0) + c(1)z$$

At step 66 the equation is solved for a complex root in the real case, or solution for the linear equation in the complex case, for z which is designated $z_1$. This root has unit magnitude and an angle designated $w_z$. This phase roll frequency $w_z$ may be computed as:

$$w_z = TAN^{-1}(Im(z_1) / Re(z_1)).$$

This frequency $w_z$ is the frequency of the echo of the known sinusoid transmitted from the near end modem when it is received back by the near end modem. To determine the phase roll estimate designated $w_{roll}$ the difference is simply taken between the transmitted frequency and the received frequency as follows in step 68:

$$w_{roll} = w_z - w_0.$$

The method described above explicitly accounts for the existence of correlated noise in the received signal, recognizing that any signal which is band limited, as in a transmission line, will exhibit non-zero autocorrelation.

Figure 3:
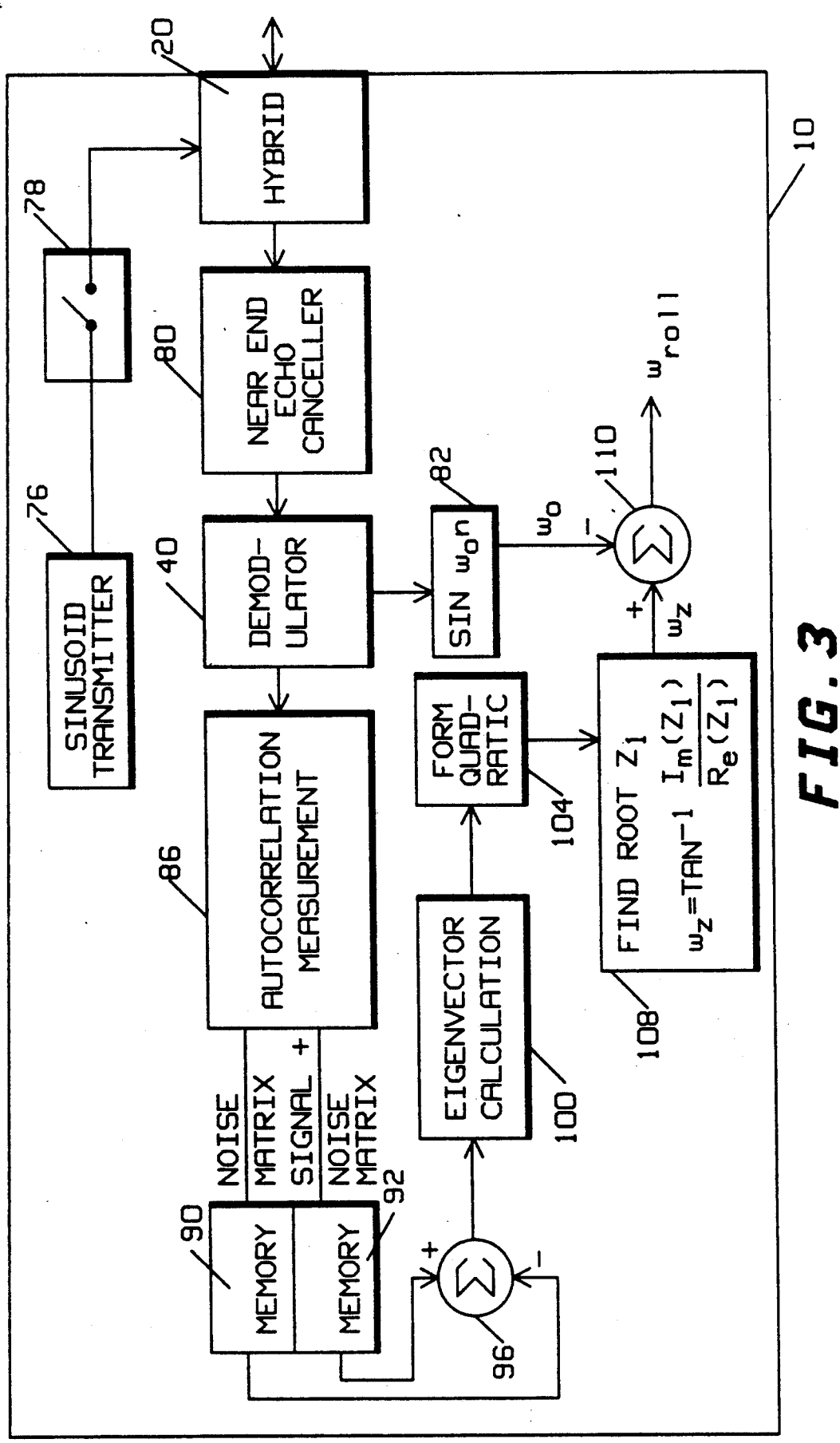
FIG. 3 is a functional block diagram of a modem incorporating the present invention.

A functional block diagram of a modem performing the phase roll estimate according to the present invention is shown in FIG. 3. One skilled in the art will appreciate that the functional blocks are preferably implemented by a general purpose computer or microprocessor or special purpose signal processor in the preferred embodiment. In order to implement the present invention, a sinusoidal transmitter 76 is coupled to the hybrid 20 through a switch 78 which functionally couples the known sinusoid to the transmission line as required in step 54. A near end echo canceller 80 is connected to the hybrid to cancel out the near end echo component if required as in step 50.

The echo canceled signal is passed to demodulator 40 which demodulates the received signal using signal source 82 before autocorrelation measurements are made at autocorrelation measurement block 86. The noise matrix B is stored in a memory location 90 while the signal plus noise matrix D is stored in memory 92. Adder 96 provides the difference in these matrices to eigenvector calculation block 100 and the appropriate quadratic is formed at block 104. At block 108, the angle of the root of the quadratic (or solution to the linear equation) is found and sent to adder 110 which computes the phase roll.

Figure 4:
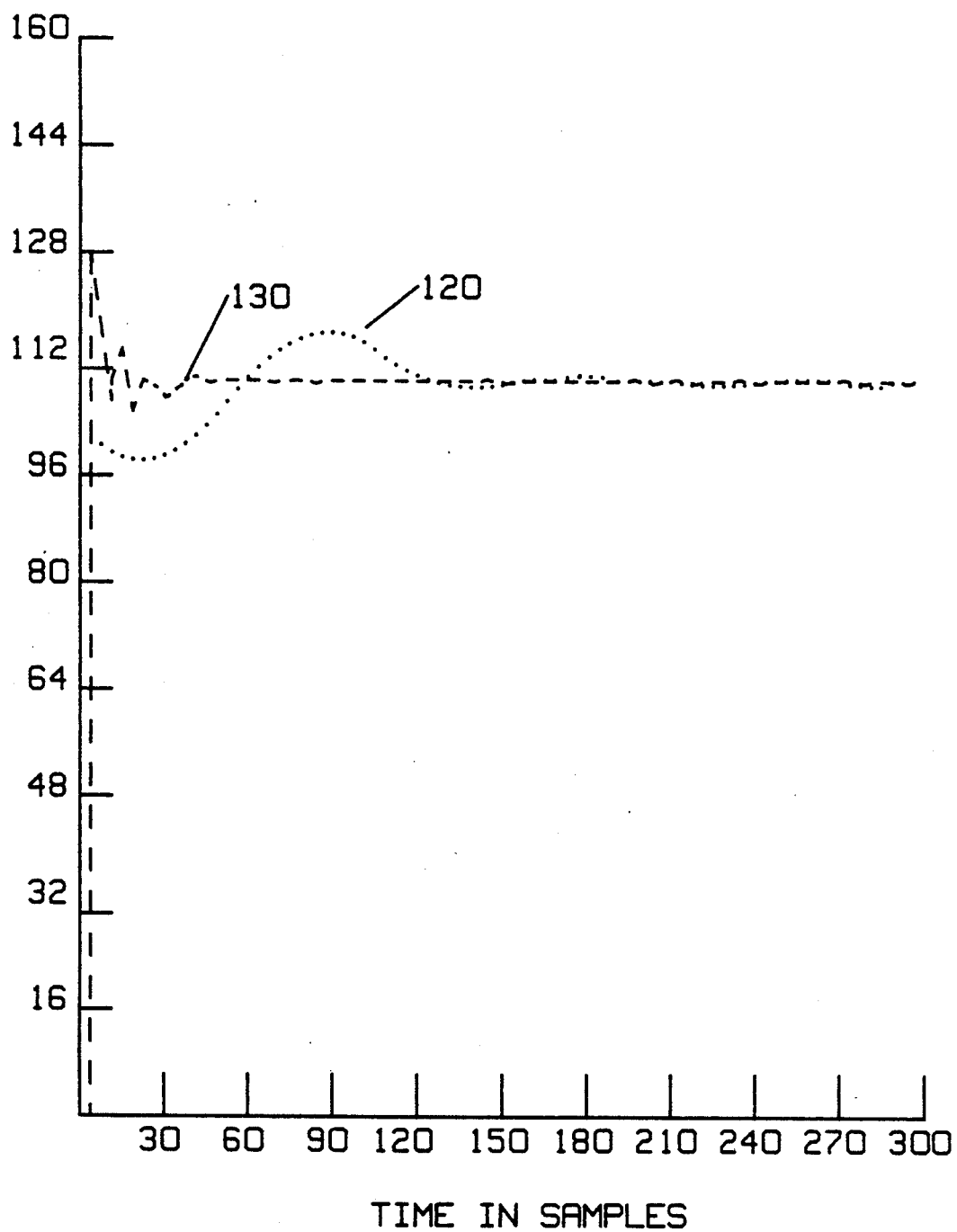
FIG. 4 is a plot comparing the speed of convergence of the present invention with that of a conventional phase locked loop.

A comparative simulation of the technique of the present invention compared with a conventional phase locked loop is shown in FIG. 4. Curve 120 represents the phase locked loop technique while curve 130 represents the technique of the present invention. As seen in the plot, curve 120 converges to the correct phase roll estimate in approximately 150 samples while the technique of the present invention converges in approximately 40 samples.

The simulation curves of FIG. 4 were generated from the FORTRAN code of the attached appendix which illustrates an implementation of the present invention in a higher level language. This listing is copyright Racal-Milgo, 1989, All Rights Reserved. This simulation does not exhaustively imitate laboratory conditions, but the results are indicative of expected behavior.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

APPENDIX
Copyright Racal-Milgo, 1989, All Rights Reserved

```
      implicit none
      real*8 w0,w,tnew,told,thatnew,thatold,whatold,whatnew
      real*8 stept,stepw,error,offset,pi,m,sdeviation
      real*8 signal(1:5),noise(1:5),noisesource(1:5)
      real*8 correlation(1:5),noicor(1:5)
      real*8 noisereal,lineerror
      real*8 pestimate
      real*8 lowgear,freqerror
      integer i,n,seedreal,j,testtime
* pblock=integ. span for pisar.
* Define noisereal as a function.
      noisereal(seedreal,sdeviation) = (3.**.5)*
     &   sdeviation*2.*(ran(seedreal)-.5)
* Initialise random number generator.
      seedreal = 38509389
      write(*,*)'told is the starting phase of the mystery sine'
      write(*,*)'stepw is the beta of weinstein'
      write(*,*)'offset is the offset (rad/s)/(sample rate in Hz)'
      write(*,*)'ie., -pi<offset<pi'
      write(*,*)'enter number of iterations, offset,
     &   stept,stepw, told'
      read(*,*)n,offset,stept,stepw,told
      write(*,*)'enter noise stan. deviat.'
      read(*,*)sedeviation
      write(*,*)'enter pll second gear'
      read(*,*)lowgear
      pi=atan(1.)*4.
c     told=0.
      thatold=0.
      whatold=0.
      w0=1.
      w=offset
      do 6 i=1,5
      signal(i)=0.
      noise(i)=0.
      noisesource(i)=0.
      correlation(i) = 10**-12.
      noicor(i)=0.
6     continue
      write(*,*)'iteration w estimate error'
      do 10 i=1,n
      if ((i*3).ne.n) goto 5
      stept=stept/lowgear
      stepw=stepw/lowgear
5     continue
7     continue !goto
c update true phase
      tnew=told + w0 + w !assume sample period = 1.
      if(tnew.gt.(2.*pi))tnew=tnew-2.*pi
c compute raw signal
      noisesource(1)=noisereal(seedreal,sdeviation)
      noise(1)=(1./3.)*(noisesource(1)+noisesource(2)+
     noisesource(3))
      signal(1) = sin(tnew) + noise(1)
c Run the PLL
c update phase estimate
      thatnew=thatold + w0 + whatold + stept*error
      if(told.gt.(2.*pi)told=told-2.*pi
c compute error measure, use phase detector to estimate tnew
      lineerror= signal(3) - cos(thatnew)
      error = lineerror*sin(-thatnew) !signal(3)*(sin(thatnew))
c update frequency estimate
      whatnew = whatold + stepw * error
c advance time
      told = tnew
      thatold = thatnew
      whatold = whatnew
c Run Pisarenko
      do 15 j=1,5
      correlation(j) = correlation(j)+signal(3)*signal(j)
      noicor(j) = noicor(j) + noise(3)*noise(j)
c For example, j=5 is the "lead 2" term, j=2 "lag 1".
15    continue
      call pisarenko(correlation,noicor,pestimate)
      write(0,20)i,whatnew,pestimate
```

APPENDIX
Copyright Racal-Milgo, 1989, All Rights Reserved

```
              write(1,20)i,pestimate
              testtime = int ( float(i) - float(100)*(i/100) + .5)
              if(testtime.ne.0)goto 17
              write(*,*)i,log10(.00000000001+abs(pestimate-(w0+w)))
17            do 16 j=5,2,-1
              signal(j)=signal(j-1)
              noise(j) = noise(j-1)
              noisesource(j) = noisesource(j-1)
16            continue
10            continue
20            format(1x,i5,2x,f10.7,2x,f10.7)
              write(*,*)'noise correlationvector'
              write(*,*)(noicor(i)/n,i=1,5)
              stop
              end
c Subroutine to test Pisarenko's method of finding a sinewave in a
c correlation function. See 4-13-89 notes (Tom Sexton).
c This program
c        c. Calculates the eigenvector c associated with the
c           0 eigenvalue using the work matrix w.
c        d. Calculates the roots (real or imag) root1, root2 of the
c           ploynomial based on the eigenvector.
c        e. Find the angles (frequencies (-wout,wout)) of the roots.
c
c           B =    B(0) B(1) B(2)
C                  B(-1)B(0) B(1)
C                  B(-2)B(-1)B(0)
C                  the argument represents advance (cf. lag)
c
              subroutine pisarenko(corvector,noicorvector,wout)
              implicit none
              real*8 corvector(1:5),noicorvector(1:5)
              real*8 w(1:3,1:3),c(1:3),wout,y
              real*8 pi,epsilon,temp,rowscale,discriminant
              real*8 realroot1,imagroot1,realroot2,imagroot2
              integer k,i,j,dummy
* Assign constants.
              pi = 4.*atan(1.)
              epsilon = 1e-12 !A small number for elimination
              decisions.
* Fill out w matrix.
              do 10 i=1,3
              do 20 j=1,3
              w(i,j)=corvector(j-i+3)-noicorvector(j-i+3)
20            continue
10            continue
* Solve wc = 0 for c. 3 iterations of Gaussian elimination.
C First:
              if( abs(w(3,1)).le.epsilon)goto 30
              if( abs(w(2,1)).le.epsilon)go to 25
              rowscale = w/(3,1)/w(2,1)
              w(3,1) = 0.
              w(3,2) = w(3,2) - rowscale*w(2,2)
              w(3,3) = w(3,3) - rowscale*w(2,3)
              goto 30
25            do 26 i=1,3 !exchange rows
              temp=w(3,i)
              w(3,i)=w(2,i)
              w(2,i)=temp
26            continue
C Second:
30            if( abs(w(2,1)).le.epsilon)goto 40
              rowscale = w(2,1)/w(1,1)
              w(2,1) = 0.
              w(2,2) = w(2,2) - rowscale*w(1,2)
              w(2,3) = w(2,3) - rowscale*w(1,3)
40            continue
C Third:
              if( abs(w(3,2)).le.epsilon)goto 50 !already done
              if( abs(w(2,2)).ge.epsilon)goto 45 !go do it
c The second element of row 2 is zero.
c Is w(2,3) = 0, or <> 0 ?
              if(abs(w(2,3)).le.epsilon)goto 46
              write(*,*)'w(2,3) <> 0 but w(2,1)=w(2,2)=0'
              goto 100
46            write(*,*)'w(2,3) = w(2,1)=w(2,2)=0'
              write(*,*)'solve using remaining 2 lines'
              goto 100
45            rowscale = w(3,2)/w(2,2)
              w(3,2) = 0.
              w(3,3) = w(3,3) - rowscale*w(2,3)
50            continue
C Execute back substitution.
C Assign c(3) a value. Assume W nonsingular due to noise.
  However,
C treat c(3) as if there were no noise.
              c(3) = 1.
              c(2) = -w(2,3)*c(3)/w(2,2)
              c(1) = -w(1,3)*c(3)/w(1,1)-w(1,2)*c(2)/w(1,1)
c Time for the quadratic formula.
              discriminant = c(2)**2. - 4.*c(1)*c(3)
              if(discriminant.ge.-epsilon) goto 60
              realroot1 = -c(2) / (2.*c(1))
              imagroot1 = ( (-discriminant)**.5) / (2.*c(1))
              relaroot2 = -c(2) / (2.*c(1))
              imagroot2 = - ( (-discriminant)**.5) / (2.*c(1))
c             write(*,*)'The UHP root is'
c             write(*,*)realroot1,imagroot1
c transform to polar
              wout = atan2(imagroot1,realroot1)
c             write(*,*)'The underlying frequency is'
c             write(*,))wout,'*pi'
              goto 70
60            write(*,*)'either this is dc or its aliased'
              wout=0.
70            continue ! a goto line
100           continue ! a goto line
              return
              end
```

What is claimed is:

1. A method for estimating a phase roll on a communication channel, comprising the steps of:

measuring a noise correlation on said communication channel;

transmitting a known signal having a predetermined frequency $w_o$ over said channel;

measuring an average signal plus noise correlation echoed as a result of said transmitting of said known signal;

forming a noise autocorrelation matrix B and a signal plus noise autocorrelation matrix D;

subtracting B from D to form a difference matrix F;

calculating an eigenvector C associated with a zero eigenvalue of F;

solving for a root of said eigenvector C; and computing a phase roll by finding a difference between an angle of said root and said predetermined frequency.

2. The method of claim 1, further comprising the step of canceling a near end echo prior to the other steps.

3. The method of claim 1, wherein all computations are carried out using complex numbers.

4. The method of claim 1, wherein all computations are carried out using real numbers.

5. The method of claim 1, wherein said B and D matrices are formed from samples taken at sample times n= -2, -1, 0, 1 and 2.

6. The method of claim 5, wherein said solving step is carried out by forming the quadratic equation:

$$0 = c(0) + c(1)z + c(2)z^2$$

where z is a variable and the values c(0), c(1) and c(2) are taken from the C vector:

$$C = \begin{bmatrix} c(0) \\ c(1) \\ c(2) \end{bmatrix} ; \text{ and}$$

and wherein said root is a root $z_1$ of said quadratic equation.

7. The method of claim 5 wherein said B matrix takes the form:

$$B = \begin{bmatrix} b(0) & b(1) & b(2) \\ b(-1) & b(0) & b(1) \\ b(-2) & b(-1) & b(0) \end{bmatrix}$$

and wherein said D matrix takes the form $$D = \begin{bmatrix} d(0) & d(1) & d(2) \\ d(-1) & d(0) & d(1) \\ d(-2) & d(-1) & d(0) \end{bmatrix}.$$

8. The method of claim 6, wherein said computing step comprises computing a phase roll frequency $w_z$ as:

$$w_z = TAN^{-1}(Im(z_1)/Re(z_1)).$$

9. The method of claim 8, further comprising the step of computing said phase roll $w_{roll}$ as:

$$w_{roll} = w_z - w_o.$$

10. An apparatus for computing a phase roll frequency of a channel, comprising in combination:
transmitting means for selectively transmitting a known signal having a predetermined frequency $w_o$ over said channel;
measuring means for measuring an average noise correlation and an average signal plus noise correlation echoed as a result of said transmitting of said known signal;
means for forming a noise autocorrelation matrix B and a signal plus noise autocorrelation matrix D;
subtracting means for subtracting B from D to form a difference matrix F;
calculating means for calculating an eigenvector C associated with a zero eigenvalue of F;
solving means for solving for a root of said eigenvector C; and
computing means for computing a phase roll by finding a difference between an angle of said root and said predetermined frequency.

11. The method of claim 10, further comprising means for canceling a near end echo.

12. The apparatus of claim 10, further comprising memory means for storing said B and D matrices.

* * * * *